United States Patent [19]

Marquardt

[11] Patent Number: 5,299,897
[45] Date of Patent: Apr. 5, 1994

[54] MASONRY FASTENER

[75] Inventor: Herman Marquardt, Pinckney, Mich.

[73] Assignee: Great Lakes Tool and Machine, Milford, Mich.

[21] Appl. No.: 74,718

[22] Filed: Jun. 9, 1993

Related U.S. Application Data

[63] Continuation of Ser. No. 918,663, Jul. 22, 1992, abandoned.

[51] Int. Cl.⁵ .............................................. F16B 15/08
[52] U.S. Cl. .................................... 411/454; 411/425; 411/447
[58] Field of Search ............... 411/456, 447, 454, 487, 411/492, 392, 398, 425, 439, 913, 491, 453, 451, 424, 446

[56] References Cited

U.S. PATENT DOCUMENTS

| 48,494 | 6/1865 | Storm | 411/451 |
|---|---|---|---|
| 1,170,603 | 2/1916 | Brunner | 411/487 |
| 1,774,846 | 9/1930 | Rosenberg | 411/451 |
| 1,971,726 | 8/1934 | Norwood | 411/352 |
| 3,391,720 | 7/1968 | Morse | 411/259 |
| 3,423,778 | 1/1969 | Morse | 411/411 X |
| 3,478,640 | 11/1969 | Elders | 411/17 |
| 3,942,329 | 3/1976 | Babcock | 411/454 X |
| 4,828,445 | 5/1989 | Giannuzzi | |
| 4,963,062 | 10/1990 | Giannuzzi | 411/446 X |
| 5,049,018 | 9/1991 | Murphy | 411/447 |
| 5,069,588 | 12/1991 | Hasan et al. | 411/451 X |
| 5,122,022 | 6/1992 | Kluser | 411/451 X |

FOREIGN PATENT DOCUMENTS

| 71212 | 2/1916 | Austria | 411/401 |
|---|---|---|---|
| 215741 | 6/1961 | Austria | 411/453 |
| 915732 | 7/1954 | Fed. Rep. of Germany | 411/456 |
| 650351 | 12/1962 | Italy | 411/456 |
| 24751 | of 1915 | United Kingdom | 411/392 |
| 152736 | 10/1920 | United Kingdom | 411/454 |
| 428420 | 5/1935 | United Kingdom | 411/456 |

*Primary Examiner*—Rodney M. Lindsey
*Attorney, Agent, or Firm*—Harness, Dickey & Pierce

[57] ABSTRACT

A one-piece fastener adapted to be driven into a drilled hole in masonry material. The fastener includes features which define a helical flight causing the fastener to rotate as it is driven in place. The fastener shank is configured to cause abrasion of the pre-drilled hole and is dimensioned such that a radially compressive force acts on the wall of the masonry hole to provide for enhanced retention of the fastener after it is set in place. A radially enlarged shoulder is provided on the fastener adjacent its driving end to tightly engage the entrance end of the masonry hole to provide firm radial support for the driving head and structure which it supports.

4 Claims, 1 Drawing Sheet

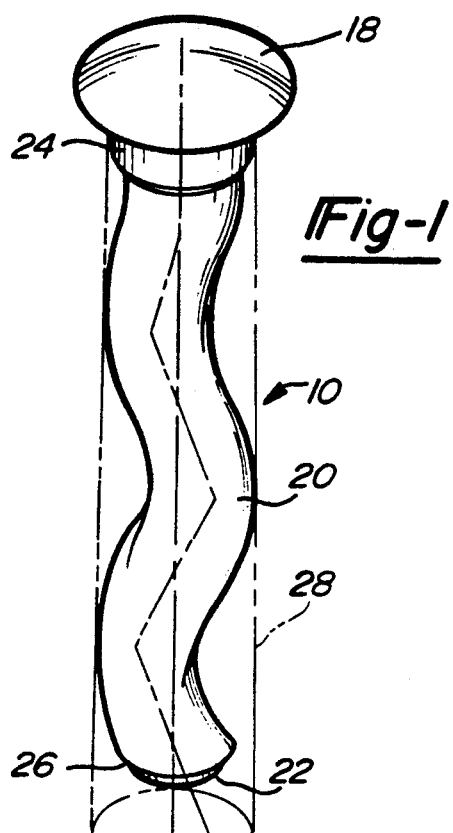
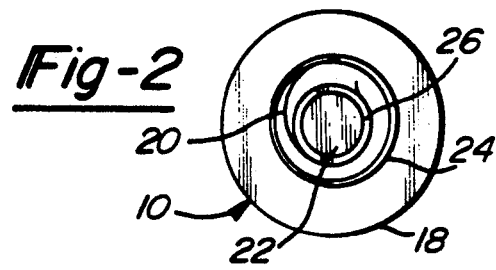
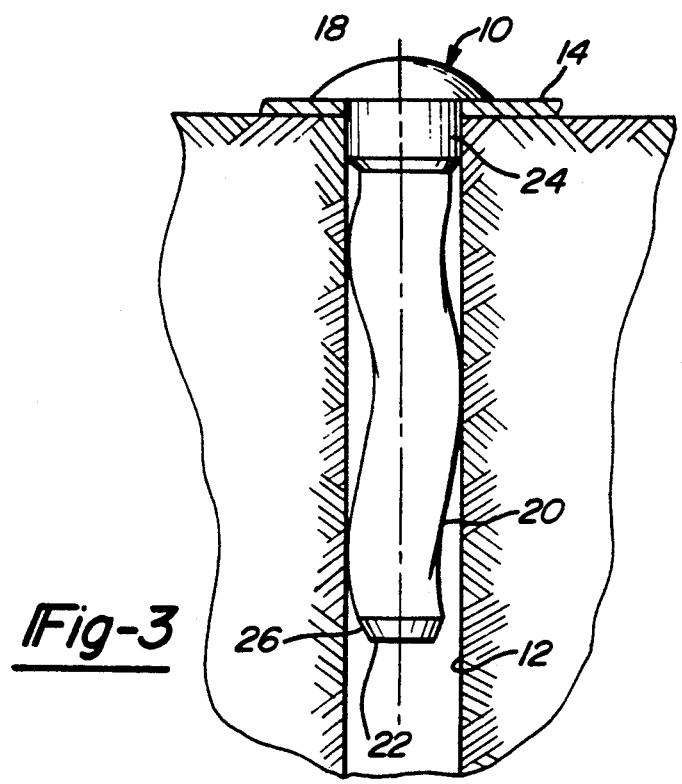
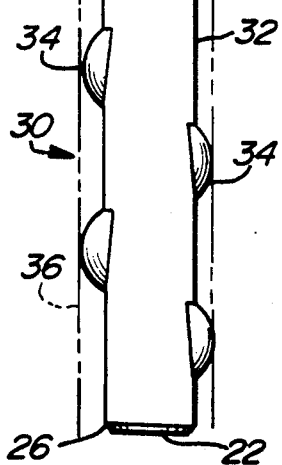
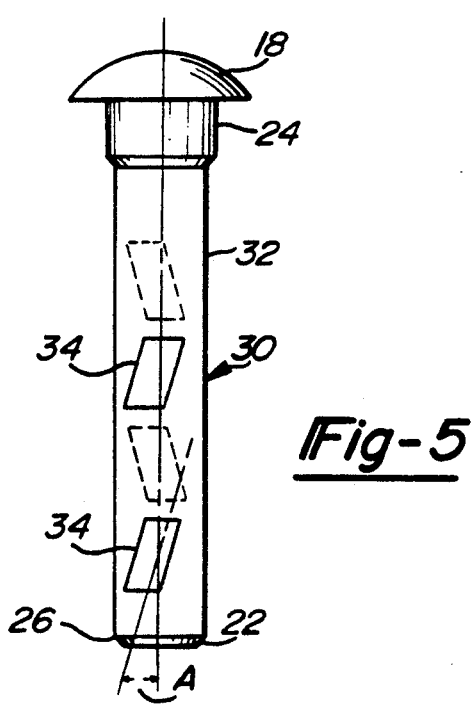

MASONRY FASTENER

This is a continuation of U.S. patent application Ser. No. 07/918,663, filed Jul. 22, 1992 and entitled "Masonry Fastener" now abandoned.

BACKGROUND AND SUMMARY OF THE INVENTION

This invention relates to a fastener and particularly to one that is forceably driven into a drilled hole within masonry material.

There are many instances in which there is a need to fasten a fixture or structural member to masonry material, for example a concrete floor. Various fastening systems are know such as nails driven directly into concrete without a pre-drilled hole. Various other types of fasteners are used where a pre-drilled hole is provided. For example, expandable type anchors are often used for such applications. Although expandable anchors perform well, they are costly in that they have multiple components and often require a significant amount of time to install.

This invention is related to one-piece masonry anchoring fasteners which are driven into a drilled masonry hole. Exceptional retention power is provided by the fasteners by providing features of the fastener shank which engage the wall of the drilled hole. The fasteners of this invention further incorporate features which cause them to rotate as they are driven into the hole. One embodiment features a shank made from a constant diameter wire stock which is wrapped to form a helix which defines a cylinder having a diameter greater than that of the drilled hole. In another embodiment local radial projections act as blades which define a portion of a helix for causing the fastener to rotate upon installation. In both embodiments high retention force is provided through the mechanisms of frictional engagement with the hole wall through bending deflection of the fastener, modification of the hole wall for greater surface area and conformation of the wall and fastener, and the turning of the fastener.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a side elevational view of a fastener in accordance with a first embodiment of this invention in a "free" condition before installation.

FIG. 2 is an end view of the fastener of FIG. 1.

FIG. 3 is a side elevational view of the fastener of FIG. 1 shown driven into a drilled masonry hole.

FIG. 4 is a side elevational view of a fastener according to a second embodiment of this invention.

FIG. 5 is a side elevational view of the fastener shown in FIG. 4 but rotated about a vertical axis 90°.

DETAILED DESCRIPTION OF THE INVENTION

A fastener according to the first embodiment of this invention is shown in a "free" condition before installation in FIGS. 1 and 2, and is generally designated there by reference number 10. Fastener 10 is shown in FIG. 3 installed within a pre-drilled hole 12 within masonry material such as poured concrete. Fastener 10 is shown being used to affix metal plate 14 to the masonry structure. Plate 14 could be used for any type of mounting function, and its configuration as shown in FIG. 3 is for illustration purposes only. Pre-drilled hole 12 is formed using a conventional masonry drill bit and is deeper than the overall length of fastener 10.

Fastener 10 includes a driving head 18 which is used for installing the fastener using a hammer or other impact device. Fastener shank 20 extends from head 18 to terminal end 22. Shank 20 has an enlarged cylindrical shoulder 24 adjacent to driving head 18 which extends a short distance along shank 20 relative to its overall length. Shoulder 24 has a diameter which is larger than the nominal diameter (i.e. the size of the drill bit used) of hole 12. For example, in the instance where hole 12 is formed using a one-quarter inch drill, shoulder 24 would have a diameter of approximately 0.280 inch which, as will be explained in more detail below, insures tight engagement of the shank 20 within hole 12

Fastener shank 20 is formed to engage with the side wall of hole 12. Shank 20 is made of wire stock having a diameter which is slightly less than that of hole 12, for example, 0.240 inch where the nominal hole size is one-quarter inch. The wire, however, is deformed such that it generates a helix as shown in the Figures. Preferably a helix or "lead" angle relative to the longitudinal axis of the fastener as designated by the angle A in FIG. 1 is preferably in the range of 10° to 20°. In the "free" state shown in FIG. 1, the helical offset is sufficient such that the shank 20 defines boundaries of an imaginary enclosing cylinder 28 which is larger in diameter than that of hole 12. These inventors have found that for a one-quarter inch drilled hole, a cylinder 28 size of 0.300 inch provides excellent fastener retention characteristics.

For aid in locating and driving fastener 10, terminal end 22 incorporates champer 26 to aid in locating and driving the fastener. Examples of fasteners according to this invention have been made by the inventor using 1032 steel hardened to 32 on the Rockwell "C" scale. Fastener 10 can be made by cold forming wire stock.

After pre-drilled hole 12 is formed and plate 14 or any other structure to be mounted is positioned, fastener 10 is set in position with champered end 26 in the entrance of the hole. A driving device such as a maul is used to force fastener 10 in place. In the process of driving fastener 10 into hole 12, the helical configuration of shaft 20 causes the fastener to rotate as it is driven to its final position as shown in FIG. 3. Once driven into position, fastener 10 is firmly anchored and substantial force is necessary to pull it out of hole 12.

The retention characteristics of fastener 10 are generated through three distinct mechanisms. The configuration of shank 20 coupled with the structural characteristics of the shank material are selected to cause the masonry hole 12 to be abraded as the fastener is driven into position, thus changing its shape slightly and generating a shallow spiral groove in the hole wall. This abrading increases the surface area of contact between the fastener 10 and hole 12, and generates a roughened inside wall surface which causes the masonry material to further mechanically engage shank 20. In addition, the process of driving shank 20 causes the helix of the shank to "straighten out" or flatten which causes elastic deformation of the shank material primarily in bending. This elastic bending deformation causes a constant radially outward expansion force to act on the wall of hole 12. Another factor enhancing the restraining power of fastener 10 is the helical configuration of shank 20 which causes the fastener to turn or "thread" upon insertion and forces the fastener to turn in the reverse direction when being removed which increases retention force, in much the same way as a traditional threaded fastener does.

When hole 12 is drilled with conventional processes it will invariably have a slight "bell mouth" characteristic in that the entrance of the hole is somewhat enlarged relative to the nominal size of the drill bit used. This results due to the fact that the drill bit is initially unrestrained when starting the hole thus removing material around the bore opening, chipping of the material at the entrance end of the hole, and due to the abrading action of the drill bit shank along the wall during drilling. In addition, as stated previously, the hole 12 is abraded through the process of driving the fastener. In that the wire stock of shank 20 has a diameter significantly less than that of the diameter of hole 12, "wiggling" of the fastener would take place if means were not provided for radially restraining driving head 18. Accordingly, shoulder 24 is provided having a diameter larger than the nominal diameter of hole 12 a drilled which causes the driving head 18 to be tightly radially restrained through an interference relationship with the entrance end of hole 12. Due to the interference relationship, some abrading of hole 12 at the entrance end area is likely to occur upon fully setting of fastener 10. However, abrasion and scoring of the wall surfaces of hole 12 are not of concern since fasteners of this invention are intended to be permanently set and are not to be reused and this action increases retention force.

A fastener in accordance with the second embodiment of this invention is shown in FIGS. 4 and 5, and is generally designated by reference number 30. Fastener 30 incorporates some features which are common to that of fastener 10, including the driving head and shoulder which are identified by like reference numbers. Fastener 30 differs in that shank 32 has a longitudinal axis which is straight and is not deformed in a helical fashion like that of the first embodiment. For the example shown, shank 32 is made of 0.240 wire when used for a pre-drilled one-quarter inch masonry hole 12. Staggered along the longitudinal length of shank 32 is a series of radially outwardly projecting "wings" or blades 34. As best shown in FIG. 4, wings 34 are oriented to define a helix angle as shown in FIG. 5 and are axially staggered. Wings 34 cause fastener 30 to turn as it is driven to its seated position in hole 12. Prior to installation, the outside diameter of imaginary cylinder 36 defined by wings 34 would be in the area of 0.300 inch for a hole drilled using a one-quarter inch bit.

In use, fastener 30 behaves much like fastener 10 in the mechanisms for providing a high retention force. Upon driving of fastener 30, wings 34 cause the fastener to undergo a helical or turning path. Wings 34 abrade the inside surface of the hole to define a gouged out shallow spiral flight within the hole. Once positioned, shoulder 24 provides an interference fit with the entrance end of hole 12. Due to the staggered orientation of wings 34 as shown as FIG. 4. Bending loads are placed on shank, 32 causing a radially outward compliant force to be exerted by wings 34 against the inside surface of hole 12. In addition, the fastener 30 tends to turn upon withdrawal and abrades the wall of hole 12. Accordingly, the mechanisms for providing retention force are consistent with those explained in conjunction with fastener 10.

Although fasteners 10 and 30 are specifically described as used for a one-quarter inch pre-drilled hole fasteners consistent with this invention could be made having a wide range of diameter capabilities which would at least include fasteners for holes from one-eighth inch to one inch in diameter. Similarly, various lengths could be provided.

Additional benefits and advantages of the present invention will become apparent to those skilled in the art to which this invention relates from the subsequent description of the preferred embodiments and the appended claims, taken in conjunction with the accompanying drawings.

What is claimed is:

1. A fastener for installing in a pre-drilled hole in masonry material, comprising:

an elongated shank having an enlarged head for forcibly driving said fastener into said hole, said shank in the region between said head and a terminal end thereof formed of uniform diameter round stock and having a diameter being less than said hole diameter, at least a portion of said shank being deformed to form a helix wherein said deformed portion of said shank occupies a cylinder in a free state having a diameter greater than said hole diameter, said fastener being adapted such that said shank turns upon being driven into said hole and is radially compressed through bending deflection and deformed by said hole such that a continuous helical contact line is defined between said hole and said deformed portion of said shank along which said radial compressive force acts between said shank and said hole which retains said fastener within said hole, said helical contract line making at least one full turn along the length of said hole, said deformed portion being adapted to abrade and causing said pre-formed hole to be abraded upon driving of said shank into said hole to form a helical groove in said hole thereby increasing frictional and surface-to-surface contact between said shank and said hole, whereby said fastener is secured within said hole through cooperation of the bending deflection of said shank, the increased frictional contract between said fastener and said hole as induced by the abrading of said hole, and the turning of said fastener during attempted withdrawal from said hole.

2. A fastener according to claim 1 wherein said helix defines a helix angle of between 10° and 20° relative to the longitudinal axis of said fastener.

3. A fastener according to claim 1 wherein said shank defines an enlarged shoulder adjacent to said head of a diameter greater than said masonry hole diameter whereby said shoulder is in tight interference relationship with said hole when said fastener is fully driven into said hole.

4. A fastener according to claim 3 where said shoulder has a cylindrical outside surface.

* * * * *

UNITED STATES PATENT AND TRADEMARK OFFICE
CERTIFICATE OF CORRECTION

PATENT NO. : 5,299,897
DATED : April 5, 1994
INVENTOR(S) : Herman Marquardt

It is certified that error appears in the above-indentified patent and that said Letters Patent is hereby corrected as shown below:

Column 4, Line 49, Claim 1 delete "contract" and insert --contact--.

Signed and Sealed this

Sixth Day of September, 1994

Attest:

BRUCE LEHMAN

Attesting Officer   Commissioner of Patents and Trademarks